United States Patent
Fujii et al.

(10) Patent No.: US 8,491,279 B2
(45) Date of Patent: Jul. 23, 2013

(54) ELECTRIC PUMP FOR HYDROGEN CIRCULATION

(75) Inventors: Toshiro Fujii, Kariya (JP); Fumihiro Suzuki, Kariya (JP); Yoshiyuki Nakane, Kariya (JP); Masanao Kagami, Kariya (JP); Katsutoshi Shiromaru, kariya (JP); Hiroaki Kato, Kariya (JP)

(73) Assignee: Kabushiki Kaisha Toyota Jidoshokki, Aichi-ken (JP)

( * ) Notice: Subject to any disclaimer, the term of this patent is extended or adjusted under 35 U.S.C. 154(b) by 581 days.

(21) Appl. No.: 11/655,812

(22) Filed: Jan. 18, 2007

(65) Prior Publication Data
US 2007/0177999 A1 Aug. 2, 2007

(30) Foreign Application Priority Data

Jan. 20, 2006 (JP) .................................. 2006-13082

(51) Int. Cl.
*F04B 17/03* (2006.01)
*F04B 35/04* (2006.01)
*H02K 1/06* (2006.01)
*H02K 1/18* (2006.01)

(52) U.S. Cl.
USPC ................. 417/410.4; 310/216.123

(58) Field of Classification Search
USPC ............. 417/410.4, 423.7; 310/273, 216.121, 310/216.129, 216.123, 216.124, 156.09, 310/156.12
See application file for complete search history.

(56) References Cited

U.S. PATENT DOCUMENTS

| 2,140,966 | A | * | 12/1938 | Nichols ...................... 417/410.4 |
| 2,193,408 | A | * | 3/1940 | Knight .......................... 310/426 |
| 2,698,911 | A | * | 1/1955 | Schaefer ......................... 310/86 |
| 2,938,131 | A | * | 5/1960 | Maynard ......................... 310/87 |
| 3,001,093 | A | * | 9/1961 | Wilcox et al. ................. 310/158 |
| 5,283,469 | A | * | 2/1994 | Forbes et al. ................. 290/1 C |
| 5,569,022 | A | | 10/1996 | Rossi |
| 5,569,024 | A | * | 10/1996 | Dummersdorf et al. ....... 417/420 |
| 5,668,425 | A | * | 9/1997 | Marioni et al. ............... 310/162 |

(Continued)

FOREIGN PATENT DOCUMENTS

| DE | 10 2004 060 872 A1 | 7/2006 |
| EP | 0 474 004 A2 | 3/1992 |

(Continued)

OTHER PUBLICATIONS

European Search Report dated Jun. 1, 2007 issued by European Patent Office for application No. 07100734.8-1267.

*Primary Examiner* — Devon Kramer
*Assistant Examiner* — Bryan Lettman
(74) *Attorney, Agent, or Firm* — Locke Lord LLP (57) ABSTRACT

An electric pump for supplying a hydrogen gas to a fuel cell includes a rotary shaft rotatably inserted through an electric motor, a transmitting member provided on one of an outer peripheral surface of the rotary shaft and an inner peripheral surface of the electric motor so as to be rotatable therewith, and a groove formed in the other of the outer peripheral surface of the rotary shaft and the inner peripheral surface of the electric motor for the transmitting member to be inserted therein. The groove transmits a rotary torque of the electric motor to the rotary shaft by contacting an inner surface of the groove and the transmitting member and has an opening width along a rotary direction of the rotary shaft which is larger than the width of the transmitting member. The groove and the transmitting member produce an impact torque when the electric pump is started.

2 Claims, 5 Drawing Sheets

U.S. PATENT DOCUMENTS

| | | | |
|---|---|---|---|
| 5,684,348 A * | 11/1997 | Main | 310/75 D |
| 5,887,982 A * | 3/1999 | Wilcher | 384/97 |
| 6,987,373 B2 | 1/2006 | Kagami et al. | 318/471 |
| 2004/0213680 A1* | 10/2004 | Suzuki et al. | 417/310 |
| 2005/0110446 A1 | 5/2005 | Kagami et al. | |
| 2006/0131971 A1* | 6/2006 | Hangmann et al. | 310/75 C |
| 2006/0198735 A1 | 9/2006 | Iijima et al. | 417/44.1 |
| 2007/0132330 A1* | 6/2007 | Fei et al. | 310/156.78 |

FOREIGN PATENT DOCUMENTS

| | | |
|---|---|---|
| EP | 0 723 329 A2 | 7/1996 |
| EP | 1 016 786 A2 | 7/2000 |
| JP | 2003-155409 | 5/1993 |
| WO | WO 2006/018620 A1 | 2/2006 |

* cited by examiner

ELECTRIC PUMP FOR HYDROGEN CIRCULATION

BACKGROUND OF THE INVENTION

The present invention relates to an electric pump for hydrogen circulation having a rotary shaft which is rotatably supported by a housing and driven to rotate by an electric motor and a rotor which is disposed in a pump chamber and rotated by the rotary shaft.

A fuel cell system in which hydrogen and oxygen are reacted to generate electric power has therein a hydrogen circulation path through which unreacted hydrogen gas (or hydrogen off-gas) which is not used in a fuel cell is supplied to the fuel cell. A pump is provided in the hydrogen circulation path for pumping the hydrogen off-gas.

For example, an electric roots pump is used as the hydrogen-circulation pump. The electric roots pump has a pair of pump rotors which is disposed in a rotor chamber which is formed in a housing of the roots pump, and an electric motor which is disposed in the housing for rotating the pump rotors. As the electric motor rotates, the pump rotors are rotated and hydrogen off-gas is drawn into the rotor chamber and then discharged therefrom. The hydrogen off-gas which is pumped by the electric roots pump is mixed with newly supplied hydrogen gas and resupplied to the fuel cell.

In the above fuel cell system, water which is produced in the process of electric power generation by the fuel cell is discharged from the fuel cell and introduced into the rotor chamber together with the hydrogen off-gas. For example, when operation of the fuel cell system is stopped under a low-temperature environment such as subfreezing temperature, the water then remaining in the rotor chamber is condensed and frozen, with the result that the axial end surface of the pump rotor may be stuck to the inner wall surface of the rotor chamber. In this case, there is a fear that the electric roots pump fails to be started in restarting the fuel cell system.

There has been proposed an electric roots pump which is capable of starting even when the axial end surface of the pump rotor is stuck to the inner wall surface of the rotor chamber (e.g. Japanese Patent Application Publication No. 2005-155409). Specifically, Japanese Patent Application Publication No. 2005-155409 discloses a conventional electric roots pump (actually a roots compressor) which includes a selector switch which is connected between a drive motor and its power source, a starter sensor for detecting whether the drive motor is started or not, a temperature sensor for detecting that the compressor is placed under a low-temperature environment and a controller. In the state of the roots compressor where the temperature sensor detects that the compressor is placed under a low-temperature environment, the controller sends out a forward-rotation command to the selector switch thereby to cause the drive motor to rotate in the forward direction. Furthermore, unless the starter sensor detects that the drive motor is started when the controller has sent out the forward-rotation command, the controller repeatedly sends out a reverse-rotation command and the forward-rotation command alternately to the selector switch. Accordingly, the drive motor alternately generates rotary torques in the forward and reverse directions, thereby breaking frozen water. Thus, the pump rotor is separated from the inner wall surface of the rotor chamber and, therefore, the drive motor can be started up.

However, when the torque generated by the electric motor is small in the roots pump of the above-cited publication, it takes a long time to break the frozen water. Thus, the start-up of the pump is delayed. To increase the torque of the electric motor for achieving quick start-up of the pump, the electric motor needs to be made larger in size and the size of the electric roots pump is larger, accordingly.

The present invention which is made in view of the above problems is directed to an electric pump for hydrogen circulation in which an electric motor generates a greater torque without being larger in size for achieving quick start-up in a state where a rotor is stuck to the inner wall of a rotor chamber due to frozen water.

SUMMARY OF THE INVENTION

An aspect in accordance with the present invention provides an electric pump for supplying a hydrogen gas to a fuel cell. The electric pump includes a housing defining therein a pump chamber, an electric motor disposed in the housing a rotary shaft rotatably supported in the housing, rotated by the electric motor and inserted through the electric motor so as to be rotatable relative to the electric motor, a rotor disposed in the pump chamber and rotated as the rotary shaft is rotated, a transmitting member provided on one of an outer peripheral surface of the rotary shaft and an inner peripheral surface of the electric motor which faces the outer peripheral surface of the rotary shaft so that the transmitting member is rotatable therewith, and a groove formed in the other of the outer peripheral surface of the rotary shaft and the inner peripheral surface of the electric motor for the transmitting member to be inserted therein. The groove transmits a rotary torque of the electric motor to the rotary shaft by contacting an inner surface of the groove and the transmitting member. The groove has an opening width along a rotary direction of the rotary shaft. The opening width is larger than the width of the transmitting member. The groove and the transmitting member produces an impact torque when the electric pump is started.

Other aspects and advantages of the invention will become apparent from the following description, taken in conjunction with the accompanying drawings, illustrating by way of example the principles of the invention.

BRIEF DESCRIPTION OF THE DRAWINGS

The features of the present invention that are believed to be novel are set forth with particularity in the appended claims. The invention together with objects and advantages thereof, may best be understood by reference to the following description of the presently preferred embodiments together with the accompanying drawings in which:

DETAILED DESCRIPTION OF THE PREFERRED EMBODIMENTS

Figure 1:
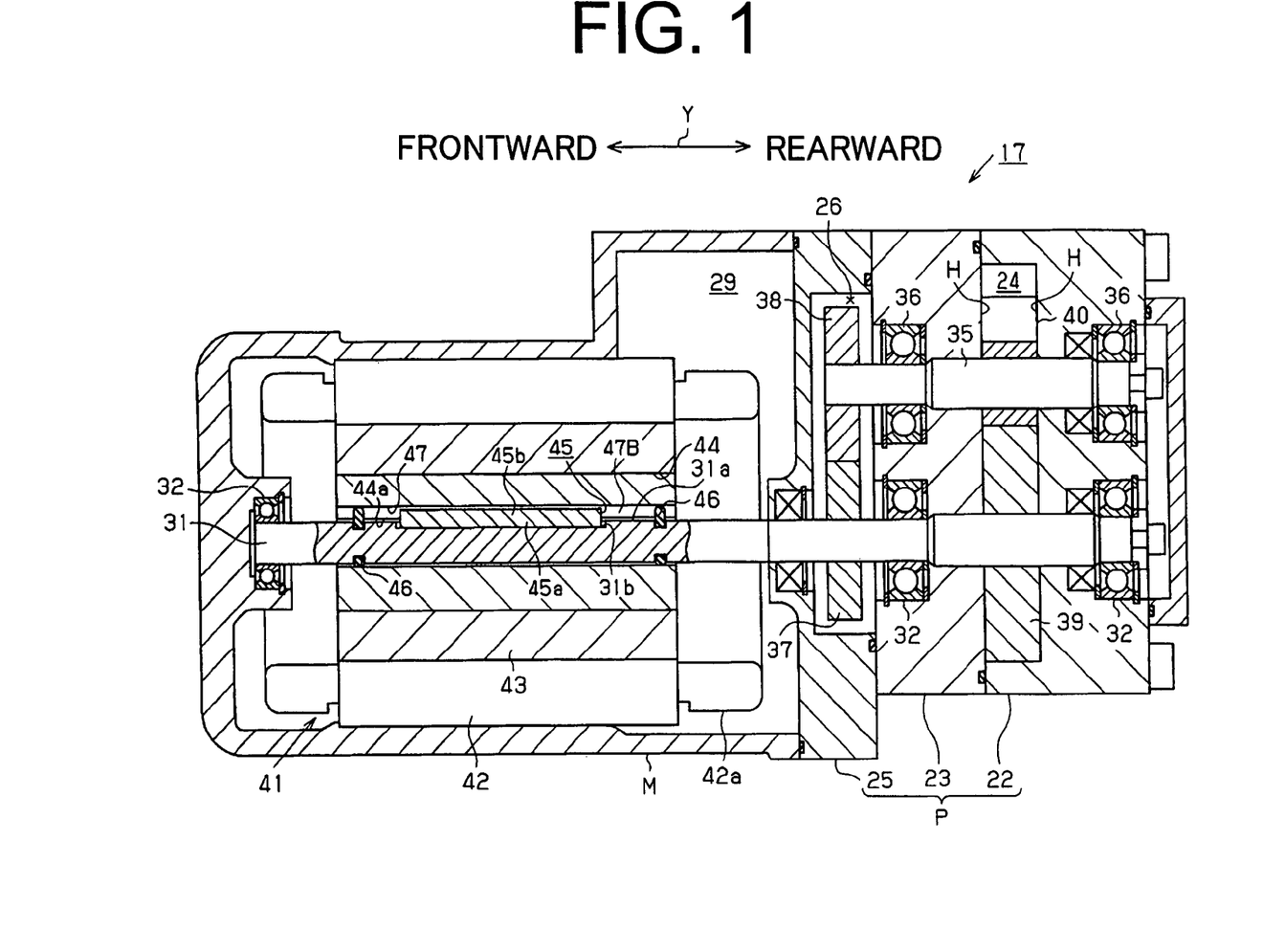
FIG. 1 is a longitudinal cross-sectional view of an electric roots pump according to a first preferred embodiment of the present invention.
Figure 2A:
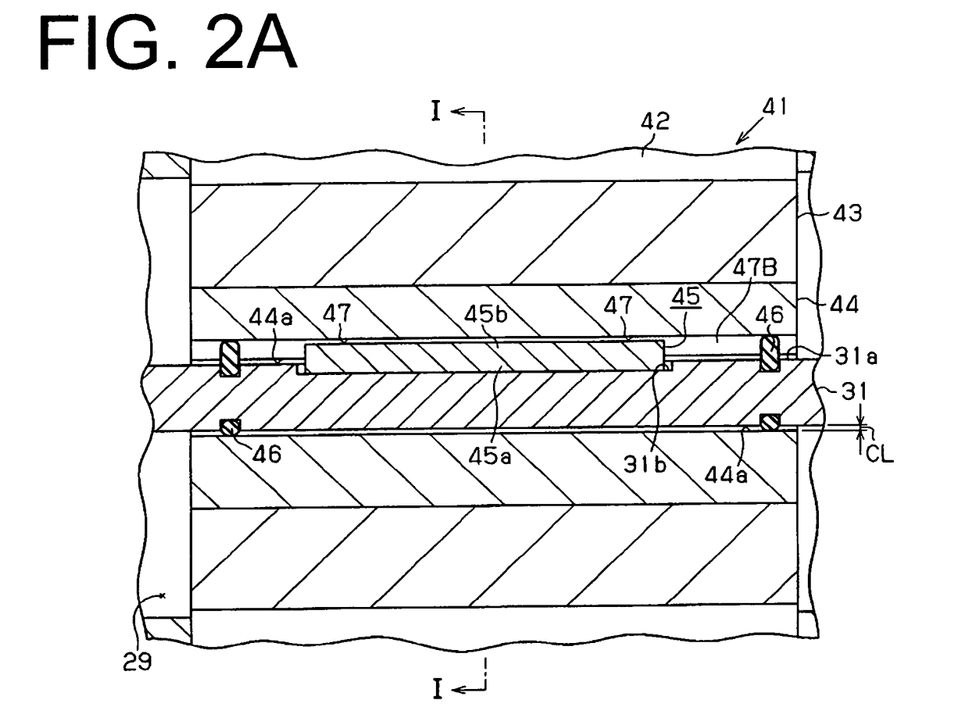
FIG. 2A is a partially enlarged cross-sectional view of the electric roots pump according to the first preferred embodiment of the present invention.
Figure 2B:
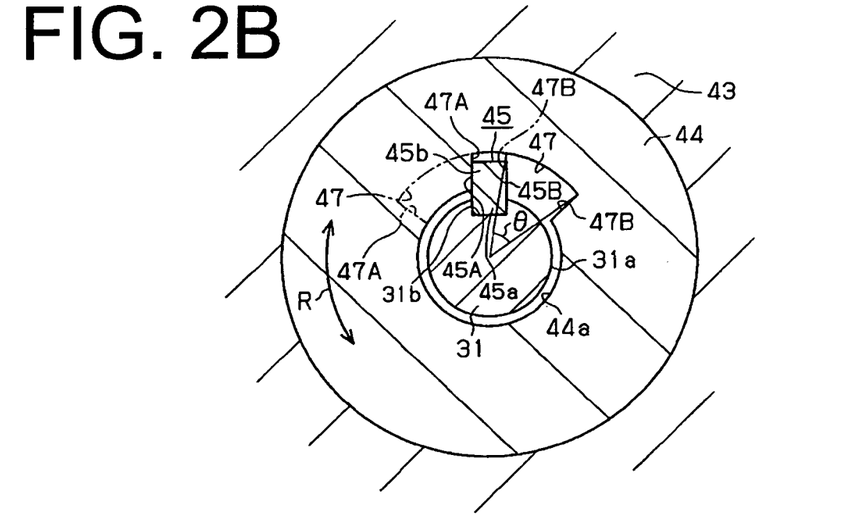
FIG. 2B is a cross-sectional view that is taken along the line I-I in FIG. 2A.
Figure 3:
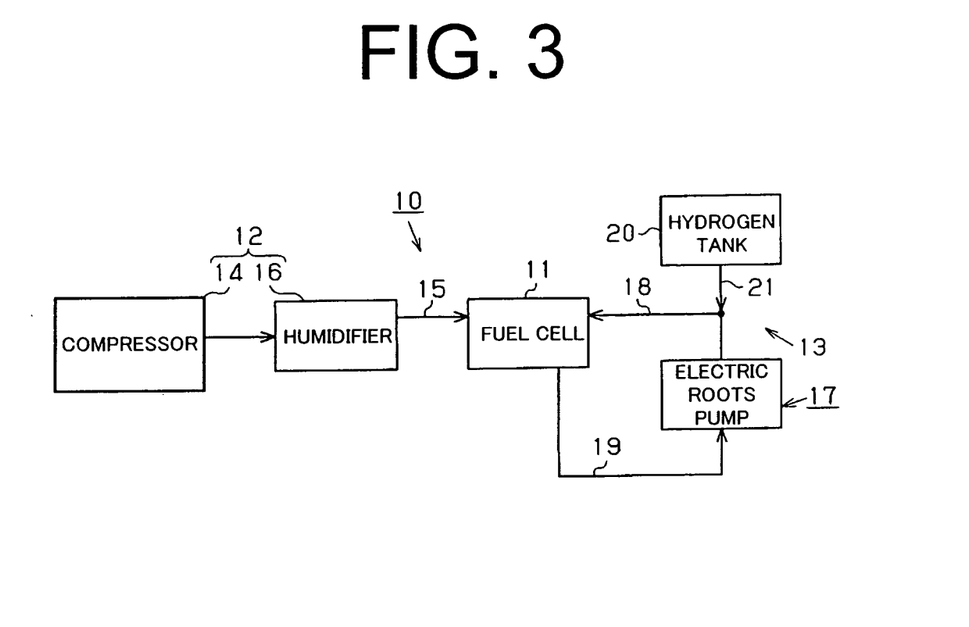
FIG. 3 is a block diagram of a fuel cell system according to the first preferred embodiment of the present invention.

The following will describe a first preferred embodiment of an electric roots pump for hydrogen circulation in a fuel cell system according to the present invention with reference to FIGS. 1 through 3. Referring specifically to FIG. 3, a fuel cell system 10 has a fuel cell 11, an oxygen-supply means 12, and a hydrogen-supply means 13. The fuel cell 11 is, for example, of a polymer electrolyte type which reacts oxygen which is supplied from the oxygen-supply means 12 with hydrogen which is supplied from the hydrogen-supply means 13 thereby to generate direct-current electric energy (direct-current power). The oxygen-supply means 12 includes a compressor 14 which is connected to an oxygen-supply port (not shown) of the fuel cell 11 through a pipe 15 for supplying the compressed air to the fuel cell 11. The oxygen-supply means 12 also includes a humidifier 16 which is arranged in the pipe 15 between the compressor 14 and the fuel cell 11.

On the other hand, the hydrogen-supply means 13 includes an electric roots pump 17 for circulating hydrogen gas which has not been used in the fuel cell 11 (or hydrogen off-gas) and resupplying the hydrogen off-gas to the fuel cell 11. The electric roots pump 17 is connected to a hydrogen-supply port (not shown) of the fuel cell 11 through a pipe 18 and to a hydrogen-discharge port (not shown) of the fuel cell 11 through a pipe 19. The hydrogen-supply means 13 also includes a hydrogen tank 20 as a hydrogen source (or a hydrogen supply source) which is connected to the pipe 18 through a pipe 21 in which a regulator (not shown) is provided. The electric roots pump 17 and the pipes 18 and 19 constitute a hydrogen circulation path for supplying to the fuel cell 11 the hydrogen off-gas together with hydrogen gas which is newly supplied from the hydrogen tank 20.

The following will describe the electric roots pump 17 in detail. It is noted that in FIG. 1 the front and the rear of the electric roots pump 17 are indicated by the double-headed arrow Y.

Referring to FIG. 1, the electric roots pump 17 has a housing assembly which includes a pump housing P and a motor housing M. The pump housing P includes a rotor housing 22, a shaft support housing 23 and a gear housing 25. The shaft support housing 23 is fixed to the front end of the rotor housing 22, and the gear housing 25 is fixed to the front end of the shaft support housing 23. The rotor housing 22 and the shaft support housing 23 cooperate to define therein the rotor chamber 24. In the rotor chamber 24, the inner surfaces of the rotor housing 22 and the shaft support housing 23 form an inner wall surface H of the rotor chamber 24. The gear housing 25 and the shaft support housing 23 cooperate to define therein a gear chamber 26. The motor housing M is fixed to the front end of the gear housing 25. The gear housing 25 and the motor housing M cooperate to define therein a motor chamber 29 in which an electric motor 41 is disposed.

A drive shaft 31 as a rotary shaft is rotatably supported by the motor housing M, the rotor housing 22 and the shaft support housing 23 through bearings 32. A driven shaft 35 extending parallel to the drive shaft 31 is rotatably supported by the rotor housing 22 and the shaft support housing 23 through bearings 36.

In the rotor chamber 24, a drive rotor 39 and a driven rotor 40 as a rotor is fixed on the drive shaft 31 and the driven shaft 35, respectively it is noted that the direction of the drive rotor 39 along the axial direction of the drive shaft 31 is defined as an axial direction of the drive rotor 39, and the direction of the driven rotor 40 along the axial direction of the driven shaft 35 is defined as an axial direction of the driven rotor 40. Each of the drive and driven rotors 39 and 40 is a two-lobe pump rotor whose cross section perpendicular to the axial direction of the drive shaft 31 and the driven shaft 35 is formed in substantially a bilobate shape.

A slight clearance is formed between each of the front and rear end surfaces of the drive rotor 39 and the inner wall surface H of the rotor chamber 24, respectively. Similarly, a slight clearance is formed between each of the front and rear end surfaces of the driven rotor 40 and the inner wall surface H of the rotor chamber 24, respectively. The clearances serve to prevent slide contact and hence seizure between the front and rear end surfaces of the drive rotor 39 and the driven rotor 40 and the inner wall surface H of the rotor chamber 24. On the other hand, the clearances are set as small as possible for reducing leak of the hydrogen off-gas. The rotor housing 22 has an inlet (not shown) through which the hydrogen off-gas is drawn into the rotor chamber 24 and an outlet (not shown) which is located on the opposite side of the inlet and through which the hydrogen off-gas in the rotor chamber 24 is discharged out. In the gear chamber 26, a drive gear 37 is fixed on the drive shaft 31 and a driven gear 38 is fixed on the driven shaft 35 for engagement with the drive gear 37.

In the fuel cell system 10 having the above electric roots pump 17, the drive shaft 31 is rotated by the electric motor 41. The driven shaft 35 and the drive shaft 31 are rotated in opposite directions to rotate the drive rotor 39 and the driven rotor 40 due to the engagement of the drive gear 37 and the driven gear 38. As the drive rotor 39 and the driven rotor 40 are rotated, the hydrogen off-gas which is exhausted from the fuel cell 11 is drawn into the rotor chamber 24 through the pipe 19 and the inlet. Then, the outer surfaces of the drive rotor 39 and the driven rotor 40 and the inner wall surface H of the rotor chamber 24 cooperate to send the hydrogen off-gas in the rotor chamber 24 toward the outlet, through which the hydrogen off-gas is discharged out into the pipe 18. The hydrogen off-gas in the pipe 18 is resupplied to the fuel cell 11 together with the hydrogen gas which is newly supplied from the hydrogen tank 20 through the pipe 21.

The following will describe the electric motor 41 in detail. Referring to FIG. 1, the electric motor 41 includes a stator 42 which is secured to the inner surface of the motor housing M and a motor rotor 43 which is provided inside the stator 42. The motor rotor 43 is rotatable relative to the stator 42 in rotary directions indicated by a double-headed arrow R in FIG. 2B. The electric motor 41 also includes a guide member 44 which is provided inside the motor rotor 43 and rotatable with the motor rotor 43 in the directions of the double-headed arrow R. The stator 42 has stator coils 42a which are electrically connected to an external power source (not shown) through a plurality of lead wires (not shown).

Referring to FIG. 2A, the motor rotor 43 is formed in the shape of a cylinder. The guide member 44 is press-fitted in the motor rotor 43 so that the outer peripheral surface of the guide member 44 is in press contact with the inner peripheral surface of the motor rotor 43. The drive shaft 31 which is rotatably supported by the housing assembly is inserted through the guide member 44, and a slight clearance CL is formed between the outer peripheral surface 31a of the drive shaft 31 and the inner peripheral surface 44a of the guide member 44 which faces the outer peripheral surface 31a. The drive shaft 31 is supported so as to be rotatable relative to the guide member 44.

A key seat 31b is formed on the outer peripheral surface 31a of the drive shaft 31 extending along the axial direction of the drive shaft 31. An elongated and thin plate-like key 45 as a transmitting member is press-fitted in the key seat 31b so that the key 45 is rotatable with the drive shaft 31. It is noted that the direction of the key 45 along the axis of the drive shaft 31 is referred to as the lengthwise direction of the key 45 and the thickness of the key 45 in the lateral direction in FIG. 2B as the width of the key 45. The key 45 has a first portion 45a (or a lower portion as shown in FIG. 1) which extends along the lengthwise direction of the key 45 and is press-fitted in the key seat 31b. The key 45 also has a second portion 45b (or an upper portion as shown in FIG. 1) which extends along the lengthwise direction of the key 45 and protrudes toward the guide member 44 from the outer peripheral surface 31a of the drive shaft 31. O-rings 46 as a seal member are provided on the outer peripheral surface 31a of the drive shaft 31 which faces the inner peripheral surface 44a of the guide member 44 and adjacently to the respective ends of the guide member 44. The O-rings 46 serves to prevent a lubricating oil which is filled between the inner peripheral surface 44a of the guide member 44 and the outer peripheral surface 31a of the drive shaft 31 from leaking out of the electric motor 41.

Referring to FIG. 2B, a groove 47 is formed on the inner peripheral surface 44a of the guide member 44 so that the inner peripheral surface 44a faces the key 45. The second portion 45b of the key 45 is inserted in the groove 47. The groove 47 extends along the rotation direction of the drive shaft 31 or the rotation direction of the motor rotor 43 that is indicated by the double-headed arrow R. The groove 47 has a pair of first and second inner side surfaces 47A and 47B which face each other in the rotation direction. The first inner side surface 47A is contactable with a first side surface 45A of the key 45 which faces in the widthwise direction of the key 45. The second inner side surface 47B is contactable with a second side surface 45B of the key 45 which faces in the opposite widthwise direction of the key 45. An opening width of the groove 47 has such a width that a clearance is formed at least either between the first inner side surface 47A of the groove 47 and the first side surface 45A of the key 45 or between the second inner side surface 47B of the groove 47 and the second side surface 45B of the key 45. In other words, the opening width of the groove 47 is set larger than the width of the key 45.

The opening width of the groove 47 as measured along the rotation direction of the drive shaft 31 or the distance between the first and second inner side surfaces 47A and 47B is set so as to allow the motor rotor 43 to rotate for a rotation angle of about 2 degrees relative to the drive shaft 31 in the state where the key 45 is inserted in the groove 47. Specifically, when the motor rotor 43 rotates for a rotation angle of about 2 degrees from the state where the first inner side surface 47A of the groove 47 is in contact with the first side surface 45A of the key 45, the second inner side surface 47B of the groove 47 is brought into contact with the second side surface 45B of the key 45. More specifically, an angle θ which is indicated in FIG. 2B is set at about 2 degrees. In other words, when the motor rotor 43 rotates for a rotation angle of about 2 degrees from the state where the first inner side surface 47A of the groove 47 is out of contact with the first side surface 45A of the key 45, the second inner side surface 47B of the groove 47 is brought into contact with the second side surface 45B of the key 45 inevitably. Although the opening width of the groove 47 allows the motor rotor 43 to rotate for a rotation angle of about 2 degrees relative to the drive shaft 31 in a state where the key 45 is inserted in the groove 47, it may be optionally changed depending on the thickness of the key 45 and the diameter of the drive shaft 31. Alternatively, the opening width of the groove 47 may be changed to a required width to generate the desired impact torque when the first and second inner side surfaces 47A and 47B of the groove 47 collides against the first and second side surfaces 45A and 45B of the key 45 as the motor rotor 43 is rotated. It is noted that the angle θ is exaggeratedly indicated in FIG. 2B for easy understanding.

The aforementioned desired impact torque is a torque which rotates the drive shaft 31 with such a magnitude that easily separates the drive rotor 39 and the driven rotor 40 from the inner wall surface H of the rotor chamber 24 to which the drive and driven rotors 39 and 40 are stuck by the frozen water. If the opening width of the groove 47 is too small, the impact torque becomes small, which makes it difficult to separate the drive rotor 39 and the driven rotor 40 from the inner wall surface H of the rotor chamber 24. Thus, the opening width of the groove 47 needs to be set so as to allow the motor rotor 43 to rotate for a rotation angle of about 2 degrees. On the other hand, if the opening width of the groove 47 is made larger, the impact torque becomes larger. Excessive torque may damage the first and second inner side surfaces 47A and 47B of the groove 47. Thus, the opening width of the groove 47 should be preferably set so as to allow the motor rotor 43 to rotate for a rotation angle of about 30 degrees at most.

The groove 47 is filled with the lubricating oil for lubricating the groove 47 and the key 45. Therefore, the O-rings 46 further have a sector portion to prevent the lubricating oil from leaking through the groove 47. The inner peripheral surface 44a of the guide member 44 is ground to be smoother than the inner peripheral surface of the motor rotor 43 in which the guide member 44 is to be press-fitted. In other words, the inner peripheral surface 44a of the guide member 44 has a friction coefficient which is smaller than that of the inner peripheral surface of the motor rotor 43.

When the fuel cell system 10 and the electric roots pump 17 are in operation, the hydrogen off-gas is drawn into the rotor chamber 24 through the pipe 19 and the inlet together with water which is produced in the fuel cell 11. The water in the rotor chamber 24 is attached to the clearance between each of the front and rear end surfaces of the drive rotor 39 and the driven rotor 40 and the inner wall surface H of the rotor chamber 24, the other part of the inner wall surface H of the rotor chamber 24 and the peripheral surfaces of the drive rotor 39 and the driven rotor 40. Under low-temperature environment, the water on the inner wall surface H of the rotor chamber 24 and the peripheral surfaces of the drive rotor 39 and the driven rotor 40 is condensed. When the operation of the fuel cell system 10 is stopped and the rotation of the drive rotor 39 and the driven rotor 40 is stopped at a subfreezing temperature, the water in the rotor chamber 24 is frozen. Thus, the front and rear end surfaces of the drive rotor 39 and the driven rotor 40 are stuck to the inner wall surface H of the rotor chamber 24.

When the fuel cell system 10 is restarted and the electric roots pump 17 is started up in the above stuck state of the drive and driven rotors 39 and 40, current flows from the external power source to the stator coil 42a in the electric motor 41 to generate electromagnetic induction between the stator coil 42a and the motor rotor 43, thereby rotating the motor rotor 43. It is assumed that the second inner side surface 47B of the groove 47 is in contact with the second side surface 45B of the key 45 as shown by the two-dot chain line in FIG. 2B (or a state where the first side surface 47A of the groove 47 is out of contact with the first side surface 45A of the key 45) before the electric motor 41 is started up. When the motor rotor 43 is rotated, the first inner side surface 47A of the groove 47 is moved toward the key 45 and then collides against the first side surface 45A of the key 45 as shown by the solid line in FIG. 2B. This collision produces an impact torque to the key 45 and the drive shaft 31, which is rotatable with the key 45, thereby causing the drive shaft 31 to rotate. The impact torque which is the sum of the starting torque of the electric motor 41 and an additional torque due to the rotational speed thereof is naturally greater than the starting torque of the electric motor 41.

The produced impact torque is transmitted through the drive gear 37 and the driven gear 38 to the driven shaft 35 and further to the drive rotor 39 and the driven rotor 40. The drive rotor 39 and the driven rotor 40 are rotated by the produced impact torque. As a result, the ice between the front and rear end surfaces of the drive rotor 39 and the driven rotor 40 to the inner wall surface H of the rotor chamber 24 is broken, thus the drive rotor 39 and the driven rotor 40 from the inner wall surface H of the rotor chamber 24 are released or eliminating a state where the drive rotor 39 and the driven rotor 40 are stuck to the inner wall surface H of the rotor chamber 24. After the separation of the drive rotor 39 and the driven rotor 40 from the inner wall surface H of the rotor chamber 24, contacting the first inner side surface 47A of the groove 47 with the key 45 is continued thereby to transmit a rotary torque of the motor rotor 43 to the drive shaft 31. Accordingly, the electric roots pump 17 is operated.

According to the above-described first preferred embodiment, the following advantageous effects are obtained.

(1). The electric motor 41 is configured to be rotatable relative to the drive shaft 31, and the key 45 is provided on the outer peripheral surface 31a of the drive shaft 31 for rotation with the drive shaft 31. Further, the groove 47 is formed on the inner peripheral surface 44a of the guide member 44 and the key 45 is inserted therein. The groove 47 has the opening width which is larger than the width of the key 45 so that when the motor rotor 43 rotates for a rotation angle of about 2 degrees relative to the drive shaft 31, the groove 47 (the first and second inner side surfaces 47A and 47B) collides against the key 45 (the first and second side surface 45A and 45B). When the electric motor 41 is started up, the groove 47 (the first and second inner side surfaces 47A and 47B) is made to collide against the key 45 thereby to produce at the drive shaft 31 the impact torque which is larger than the starting torque of the electric motor 41. This impact torque causes the drive shaft 31 to be rotatable. Thus, the drive rotor 39 and the driven rotor 40 are rotated and hence separated from the inner wall surface H of the rotor chamber 24.

Therefore, in stating up the electric roots pump 17, the drive rotor 39 and the driven rotor 40 can be separated from the inner wall surface H of the rotor chamber 24 by the impact torque. In other words, no additional torque is required for separating the drive rotor 39 and the driven rotor 40 from the inner wall surface H of the rotor chamber 24, in addition to the starting torque of the electric roots pump 17. As a result, the electric roots pump 17 is quickly started up even when the drive rotor 39 and the driven rotor 40 are stuck to the inner wall surface H of the rotor chamber 24 due to frozen water. Furthermore, the electric roots pump 17 does not need a large-size electric motor for quick start-up and is prevented from being made large in size.

(2) The lubricating oil is filled in the groove 47 to lubricate the groove 47 and the key 45. The lubricating oil is also filled between the drive shaft 31 and the guide member 44 to lubricate the outer peripheral surface 31a of the drive shaft 31 and the inner peripheral surface 44a of the guide member 44. The O-rings 46 are provided on the outer peripheral surface 31a of the drive shaft 31 to prevent the lubricating oil from leaking out of the electric motor 41. Thus, seizure between the electric motor 41 and the drive shaft 31 and also between the groove 47 and the key 45 is prevented, thus the electric roots pump 17 being operated smoothly.

(3) The guide member 44 is press-fitted in the motor rotor 43, and the drive shaft 31 is inserted through the inner peripheral surface 44a of the guide member 44. The inner peripheral surface 44a of the guide member 44 is ground so that the friction coefficient thereof is smaller than that of the inner peripheral surface of the motor rotor 43. Thus, the friction resistance between the inner peripheral surface 44a of the guide member 44 and the outer peripheral surface 31a of the drive shaft 31 is smaller than, for example, the friction resistance in the case where the drive shaft 31 is inserted directly in the motor rotor 43. As a result, the rotation speed of the motor rotor 43 is prevented from being lowered before the groove 47 collides against the key 45. Thus, the impact torque is prevented from being decreased and hence the drive rotor 39 and the driven rotor 40 are effectively separated from the inner wall surface H of the rotor chamber 24.

(4) Merely providing the key 45 for transmitting the torque of the motor rotor 43 and appropriately setting the opening width of the groove 47, the drive rotor 39 and the driven rotor 40 can be separated from the inner wall surface H of the rotor chamber 24. In other words, in stating up the electric roots pump 17, the drive rotor 39 and the driven rotor 40 are effectively separated from the inner wall surface H of the rotor chamber 24 by such a simple structure. Therefore, the electric roots pump 17 can be made smaller in size than the conventional roots pump in which the selector switch, the controller, the temperature sensor and the like are provided for separating the drive rotor and the driven rotor from the inner wall surface of the rotor chamber.

Figure 4:
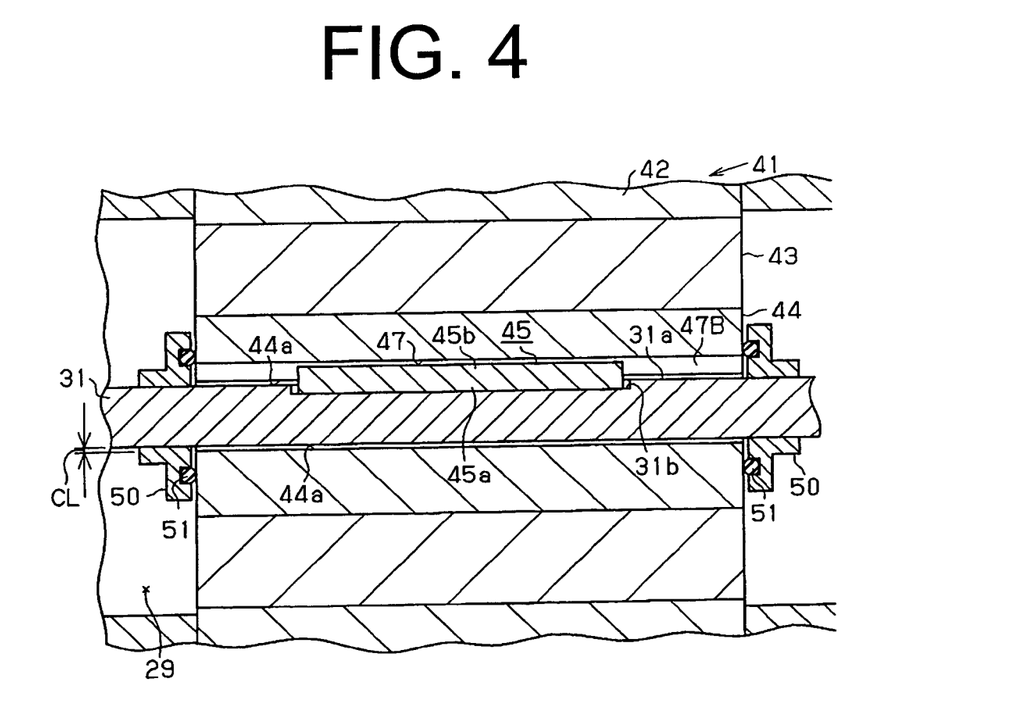
FIG. 4 is a partially enlarged cross-sectional view of an electric roots pump according to a second preferred embodiment of the present invention.

The following will describe a second preferred embodiment of an electric roots pump for hydrogen circulation in a fuel cell system according to the present invention with reference to FIG. 4. In the following description of the second preferred embodiment the same reference numerals denote the same or similar elements or components to the first preferred embodiment, and the description thereof will be omitted.

Referring to FIG. 4, end plates 50 are press-fitted on the drive shaft 31 adjacent to each of the front and rear ends of the guide member 44 (or the electric motor 41). The end plates 50 are rotatable with the drive shaft 31. O-rings 51 as a seal member are provided on each surface of the end plates 50 which face the front and rear end surfaces of the guide member 44, respectively. Namely, the O-rings 51 are interposed between the front and rear end surfaces of the guide member 44 and the end plates 50, respectively. The O-rings 51 prevent the lubricating oil, which is filled between the outer peripheral surface 31a of the drive shaft 31 and the inner peripheral surface 44a of the guide member 44 and especially between the key 45 and the groove 47, from leaking out of the electric motor 41. Therefore, seizure between the electric motor 41 and the drive shaft 31 and also between the groove 47 and the key 45 is prevented, thus the electric roots pump 17 being operated smoothly.

Figure 5:
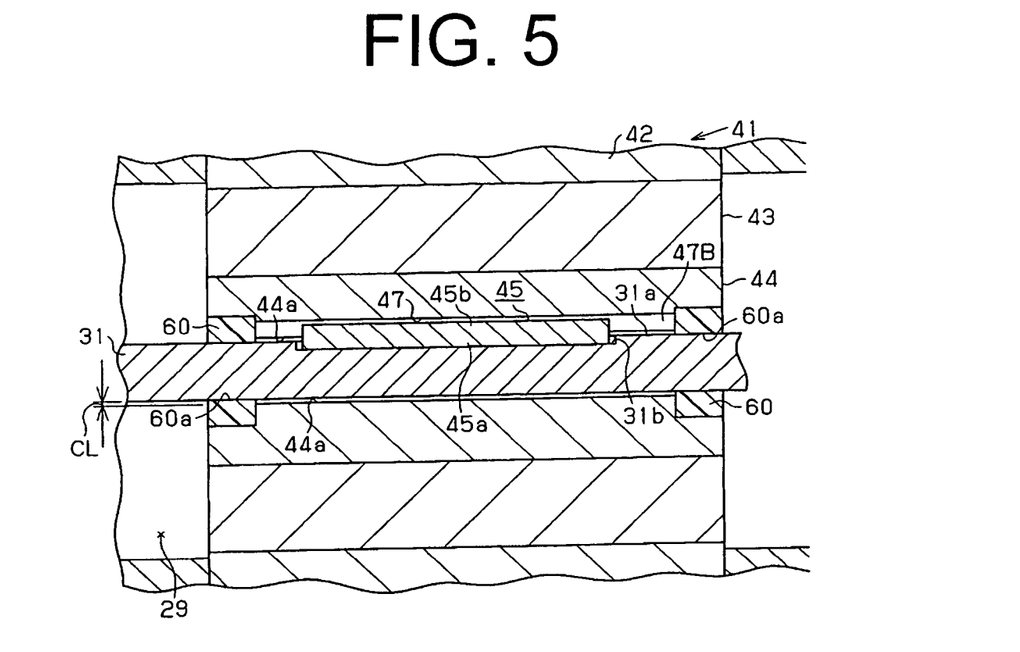
FIG. 5 is a partially enlarged cross-sectional view of an electric roots pump according to a third preferred embodiment of the present invention.

The following will describe a third preferred embodiment of an electric roots pump for hydrogen circulation in a fuel cell system according to the present invention with reference to FIG. 5. In the following description of the third preferred embodiment, the same reference numerals denote the same or similar elements of components to the first preferred embodiment, and the description thereof will be omitted.

Referring to FIG. 5, annular dry bearings 60 are provided on the inner peripheral surface 44a of the guide member 44 adjacently to its front and rear ends, respectively. The dry bearings 60 are made of a solid lubricant, such as polytetrafluoroethylene, polyacetal, or polyimide, which has a friction coefficient which is smaller than that of metal. The dry bearings 60 are rotatable with the guide member 44 and rotatably support at their inner peripheral surfaces 60a the outer peripheral surface 31a of the drive shaft 31. In other words, the inner peripheral surfaces 60a of the dry bearings 60 and the outer peripheral surface 31a of the drive shaft 31 cooperate to form a plain bearing, and the dry bearings 60 corresponds to a bearing member which is interposed between the outer peripheral surface 31a of the driver shaft 31 and the inner peripheral surface 44a of the guide member 44. Sliding resistance between the outer peripheral surface 31a of the drive shaft 31 and the inner peripheral surfaces 60a of the dry bearings 60 are reduced, thus the drive shaft 31 being smoothly rotated.

The drive shaft 31 is rotated through the dry bearings 60 without direct sliding contact of the outer peripheral surface 31a with the inner peripheral surface 44a of the guide member 44. By the sliding characteristics of the dry bearings 60, seizure of the outer peripheral surface 31a of the drive shaft 31 is prevented and the serviceable life of the electric motor 41 is extended. It is noted that a lubricating oil may be filled in the groove 47. In this case, the dry bearings 60 serves also to prevent the lubricating oil from leaking out of the electric motor 41.

Figure 6:
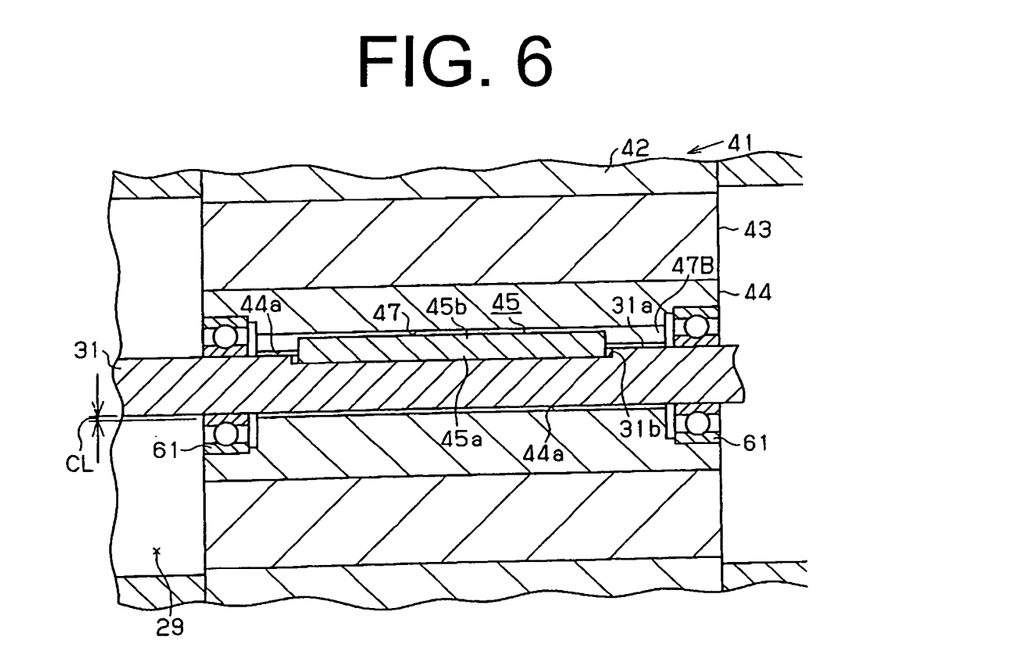
FIG. 6 is a partially enlarged cross-sectional view of an electric roots pump according to a fourth preferred embodiment of the present invention.

The following will describe a fourth preferred embodiment of an electric roots pump for hydrogen circulation in a fuel cell system according to the present invention with reference to FIG. 6. In the following description of the fourth preferred embodiment, the same reference numerals denote the same or similar elements or components to the first preferred embodiment, and the description thereof will be omitted.

Referring to FIG. 6, radial bearings 61 as a bearing member are provided between the inner peripheral surface 44a of the guide member 44 and the outer peripheral surface 31a of the drive shaft 31 adjacently to the front and rear ends of the guide member 44, respectively. The radial bearings 61 support the drive shaft 31 so that the drive shaft 31 is rotatable relative to the guide member 44 (or the motor rotor 43) for a rotation angle of about 2 degrees. The radial bearings 61 are of grease-filled type. Namely, grease as lubricating oil is filled in the radial bearings 61 to maintain lubrication of the radial bearings 61, thus the drive shaft 31 being smoothly rotated.

Figure 7:
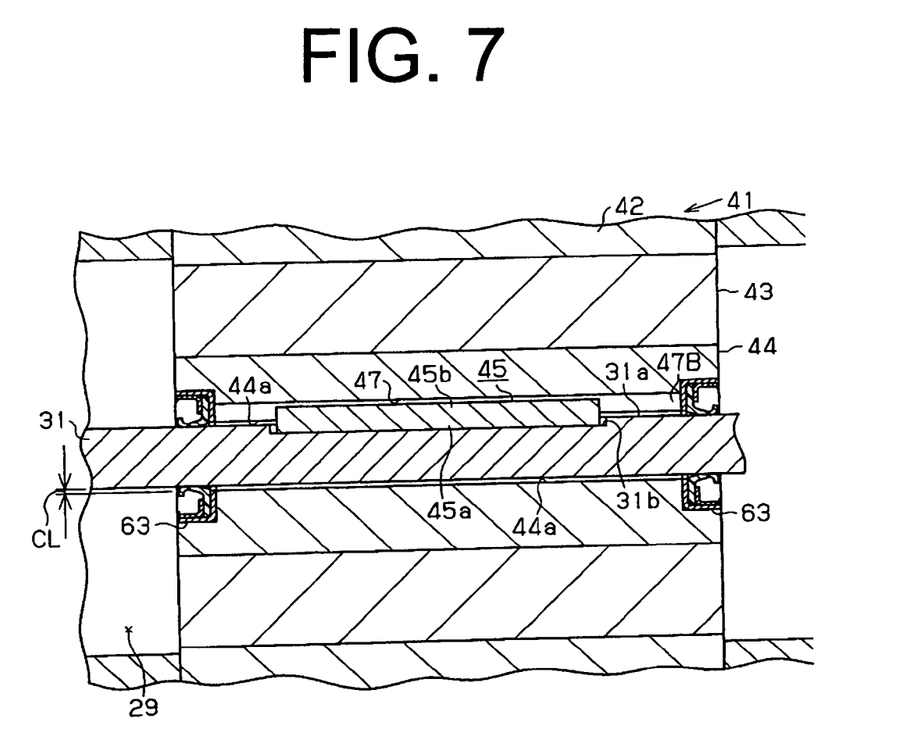
FIG. 7 is a partially enlarged cross-sectional view of an electric roots pump according to a fifth preferred embodiment of the present invention.

The following will describe a fifth preferred embodiment of an electric roots pump for hydrogen circulation in a fuel cell system according to the present invention with reference to FIG. 7. In the following description of the fifth preferred embodiment, the same reference numerals denote the same or similar elements or components to the first preferred embodiment, and the description thereof will be omitted.

Referring to FIG. 7, lip seals 63 as a seal member are interposed between the inner peripheral surface 44a of the guide member 44 and the outer peripheral surface 31a of the drive shaft 31 adjacently to the front and rear ends of the guide member 44, respectively. The seal devices 63 prevent the lubricating oil, which is filled between the outer peripheral surface 31a of the drive shaft 31 and the inner peripheral surface 44a of the guide member 44, from leaking out of the electric motor 41.

The above preferred embodiments may be modified into various alternative embodiments as exemplified below.

In an alternative embodiment, the groove 47 may be formed in the outer peripheral surface 31a of the drive shaft 31, the first portion 45a of the key 45 may be press-fitted in the inner peripheral surface 44a of the guide member 44, and the second portion 45b of the key 45 is inserted in the groove 47. In this case, as the motor rotor 43 is rotated, the key 45 is moved to collide against the first and second inner side surfaces 47A and 47B of the groove 47.

In another alternative embodiment, the rotation angle for which the electric motor 41 rotates until the key 45 is brought into contact with the groove 47 may be a specific angle which is obtained by dividing 360 degrees by the number of the stator coils 42a, and the obtained specific angle may be used for the opening width of the groove 47. According to this structure, the motor rotor 43 is moved for the specific angle for which the motor rotor is rotated by one time of energization of the electric motor 41, thereby allowing the key 45 to collide against the groove 47. Thus, the controllability of the electric motor 41 is improved.

In still another alternative embodiment, the guide member 44 may be removed and the drive shaft 31 may be inserted directly through the motor rotor 43 so that the drive shaft 31 is rotatable relative to the motor rotor 43. In this case, the inner peripheral surface of the motor rotor 43 corresponds to the inner peripheral surface of the electric motor 41 which faces the outer peripheral surface 31a of the drive shaft 31. The key 45 may be provided in one of the outer peripheral surface 31a of the drive shaft 31 and the inner peripheral surface of the motor rotor 43, and the groove 47 may be formed in the other of the outer peripheral surface 31a of the drive shaft 31 and the inner peripheral surface of the motor rotor 43.

In a further alternative embodiment, alternate oil energization and de-energization may be repeated thereby to rotate the motor rotor 43 in the forward and reverse directions alternately. Thus, the first and second inner side surfaces 47A and 47B of the groove 47 collide alternately against the first and second side surfaces 45A and 45B of the key 45.

In a still further alternative embodiment, the two-lobe drive and driven rotors 39 and 40 of the electric roots pump 17 may be substituted with rotors each having three or more lobes. In an additional alternative embodiment, the electric roots pump may be of multi-stage type in which a plurality of the drive rotors 39 and a plurality of the driven rotors 40 are mounted and arranged on the drive shaft 31 and the driven shaft 35 in the axial direction thereof, respectively.

In the above preferred embodiments, the electric pump of the present invention is described as embodied for use in the electric roots pump 17 which has the drive rotor 39 and the driven rotor 40 as a rotor. Alternatively, the present invention may be applied to an electric screw pump which has screw rotors as a rotor.

The guide member 44 is press-fitted in the motor rotor 43 in the above preferred embodiments. Alternatively, the guide member 44 may be fixed to the motor rotor 43 by any suitable means such as screw or rivet.

In the above preferred embodiments, the first and second inner side surfaces 47A and 47B of the groove 47 and the first and second side surfaces 45A and 45B of the key 45 are formed flat and those flat surfaces collide against each other thereby to transmit torque.

Alternatively, either of the first and second inner side surfaces 47A and 47B of the groove 47 or the first and second side surfaces 45A and 45B of the key 45 may be formed in a spherical shape, while the other of the first and second inner side surfaces 47A and 47B and the first and second side surfaces 45A and 45B may be formed in a complementary concave shape which fits to the spherical shape.

Therefore, the present examples and embodiments are to be considered as illustrative and not restrictive, and the invention is not to be limited to the details given herein but may be modified within the scope of the appended claims.

What is claimed is:

1. An electric pump for supplying a hydrogen gas to a fuel cell, comprising:

a housing defining therein a pump chamber;

an electric motor disposed in the housing, the motor includes a cylindrical stator that is stationary relative to the housing, a cylindrical motor rotor disposed inside the stator and rotatable relative to the stator, and a cylindrical guide member disposed inside the motor rotor so as to be rotatable with the motor rotor, wherein the cylindrical motor rotor has a first axial end and a second axial end;

a rotary shaft rotatably supported in the housing, the rotary shaft being rotated by the motor rotor, the rotary shaft being inserted through the guide member so as to be rotatable relative to the stator;

a rotor disposed in the pump chamber and rotated as the rotary shaft is rotated;

a transmitting member being a key provided in a key seat extending along the axial direction of the rotary shaft on one of an outer peripheral surface of the rotary shaft between the first end and the second end of the motor rotor and an inner peripheral surface of the guide member which faces the outer peripheral surface of the rotary shaft so that the transmitting member is rotatable therewith; and a groove formed in the other of the outer peripheral surface of the rotary shaft between the first end and the second end of the motor rotor and the inner peripheral surface of the guide member for the transmitting member to be inserted therein, the groove having an inner surface extending along the axial direction of the rotary shaft, the groove transmitting a rotary torque of the motor rotor to the rotary shaft by a parallel surface contact between the inner surface of the groove and a side surface of the transmitting member such that when contacting, the groove's inner surface is parallel to the transmitting member's side surface, the groove having an opening width along a rotary direction of the rotary shaft, the opening width of the groove being set so that the motor rotor is rotatable for a rotation angle of 2 degrees or more relative to the rotary shaft until the transmitting member is brought into the parallel surface contact with the inner surface of the groove from a state where the transmitting member and the inner surface of the groove are out of contact, the groove and the transmitting member producing an impact torque when the electric pump is started that is transmitted to the rotor disposed in the pump chamber, wherein the transmitting member and the inner surface of the groove are lubricated by a lubricating oil, a plurality of seal members being provided between the electric motor and the rotary shaft for preventing the lubricating oil from leaking out of the electric motor, each seal member is a lip seal, and the groove is positioned between two of the seal members.

2. The electric pump according to claim 1, further comprising a plurality of end plates provided on the rotary shaft each of the end plates being adjacent to one of the ends of the electric motor, at least one of the plurality of seal members being interposed between each end plate and the electric motor.

* * * * *